Patented Oct. 6, 1953

2,654,793

UNITED STATES PATENT OFFICE 2,654,793

PROCESS OF PREPARING LIGHT-COLORED RUBBER HYDROCHLORIDES

Ludwig Orthner, Frankfurt am Main, and Martin Rieber, Frankfurt am Main Hochst, Germany, assignors to Farbwerke Hoechst Aktiengesellschaft vormals Meister Lucius und Brüning, Frankfurt am Main Hochst, Germany, a company of Germany No Drawing. Application February 6, 1951, Serial No. 209,708. In Germany February 9, 1950

4 Claims. (Cl. 260—771)

Rubber hydrochlorides which have been prepared by the action of hydrogen chloride on rubber show a more or less intense coloration. This is a drawback which makes itself particularly felt if the rubber has previously been decomposed by mastication or by the action of chemical agents. To avoid this drawback, it has been proposed to effect the hydrochlorination at low temperatures (below $-5°$ C.).

Now, we have found that this costly method of working which is not free from technical difficulties can be avoided and light-colored rubber hydrochlorides may be obtained by causing chlorine dioxide to act upon solutions of rubber hydrochloride. Thereby, the rubber hydrochloride is bleached without undergoing any detrimental change.

The quantity of the chlorine dioxide to be added may vary within wide limits. The quantity which is most favorable differs in different cases; it depends, for instance, on the nature of the rubber hydrochloride used. It may be ascertained by ordinary laboratory tests. If the quantity of the chlorine dioxide added is too small, the bleaching effect is not satisfactory, if it is too high, there is the danger that the rubber hydrochloride will decompose. Advantageously, the amount of the said dioxide is chosen so that any substantial decomposition of the rubber hydrochloride is just avoided. As already stated, the respective quantities may easily be ascertained by laboratory tests since decomposition of the rubber hydrochloride leads to a lowering of the viscosity of its solutions.

The process is carried out most easily with such rubber hydrochloride solutions as are obtained by the known commercial preparation involving the additive combination of hydrogen chloride with rubber. The process may be applied to any rubber hydrochlorides: to the soft products obtained by additive combination of relatively small quantities of hydrogen chloride, to the rubber hydrochlorides suitable for the preparation of foils and obtained with rather large quantities of hydrogen chloride, as well as to products formed by additive combination of large quantities of hydrogen chloride with the rubber and containing practically no unsaturated bonds.

As solvents for the rubber hydrochlorides there may be used all the compounds customarily used as solvents provided that they are not essentially attacked by chlorine dioxide at room temperature under the conditions of reaction. There may be mentioned, for instance, benzene, toluene, xylene, chloroform, dichlorethylene.

Chlorine dioxide may be added as such to the rubber hydrochloride solution for instance, by introducing gaseous chlorine dioxide into the solution or by adding a solution of chlorine dioxide, for instance, in benzene to the solution of the rubber hydrochloride. It is also possible to develop the chlorine dioxide from a rubber hydrochloride solution, still containing hydrogen chloride, by adding a chlorite to the solution and forming a suspension therewith. There may, for instance, be used alkali chlorites, such as sodium and potassium chlorite.

The particular advantage of the present invention resides in the fact that it may be carried out at ordinary temperature and an additional lightening of the rubber hydrochloride solution by some other means may be dispensed with. It is not advisable to apply higher temperatures in view of the tendency of the chlorine dioxide to decompose.

The reaction between the rubber hydrochloride and chlorine dioxide does not occur instantaneously, but takes some time. For this reason, the rubber hydrochloride solution containing chlorine dioxide is allowed to stand for some time. The end of the bleaching or its having progressed to a satisfactory degree may, likewise, be determined easily by testing a sample taken from the reaction mixture. The periods required range from between about 30 minutes to several hours, for instance 10 hours.

The bleaching finished, the solution of rubber hydrochloride may be freed from excess chlorine dioxide e. g. by blowing air or an inert gas, such as nitrogen, into the solution and/or by heating the solution at temperatures of about 60 to about 70° C.; after neutralization the solution is worked up as usual.

The following examples serve to illustrate the invention, but they are not intended to limit it thereto.

(1) 1–2 liters of a dry m./10-solution of chlorine dioxide in benzene are introduced at room temperature into 150 kilos of a neutral 10% rubber hydrochloride solution in benzene, while well stirring. After about ½ hour, any excess of chlorine dioxide which may be present is removed by blowing air into the solution or by gently warming it. The solution is worked up in the usual manner.

(2) 1000 kilos of a 10% rubber solution, treated with hydrogen chloride (for instance according to U. S. Patent No. 1,989,632), are neutralized, while well stirring, with 50 kilos of finely pulverized sodium carbonate which has been mixed intimately with about 0.5 kilo of finely pulverized sodium chlorite. After stirring for about ½–1 hour, the excess chlorine dioxide is removed by introducing air or by gently warming. This process has the advantage of avoiding the working with free, explosive chlorine dioxide.

(3) 1.5 liters of a dry m./2-solution of chlorine dioxide in benzene are introduced at room temperature into 100 kilos of an about 10% neutral rubber hydrochloride solution in benzene, while stirring. The solution at once assumes an intense orange-brown color which disappears again in the course of 10–20 minutes. Subsequently, a current of nitrogen may be passed through the solution in order to remove any traces of chlorine dioxide which may be present in excess. The solution, however, is ready for use also without such treatment.

(4) 100 kilos of a solution of rubber in benzene are treated with gaseous dry hydrogen chloride (as in Example 2). When the desired degree of hydrochlorination has been reached, the bulk of hydrogen chloride is removed by blowing in nitrogen. Then, there are gradually added at room temperature 2.5 kilos of sodium bicarbonate, 1 kilo of sodium sulfate and 35 grams of sodium chlorite which previously have been intimately mixed together. The whole is stirred for about 1 hour and the solution is heated for about another hour at 60–70° C.; during this operation, it is possible to pass a weak nitrogen current through the solution. The latter is centrifuged to free it from salts.

We claim:

1. In the process of preparing light-colored rubber hydrochlorides the step which comprises dissolving chlorine dioxide at room temperature in a solution of a rubber hydrochloride.

2. In the process of preparing light-colored rubber hydrochlorides the step which comprises introducing at room temperature gaseous chlorine dioxide into a solution of a rubber hydrochloride.

3. In the process of preparing light-colored rubber hydrochlorides the step which comprises adding at room temperature a solution of chlorine dioxide to a solution of a rubber hydrochloride and allowing the mixture to stand for a period between about 30 minutes and about 10 hours.

4. In the process of preparing light-colored rubber hydrochlorides the step which comprises adding at room temperature an alkali chlorite to a solution of rubber hydrochloride said solution still containing free hydrogen chloride.

LUDWIG ORTHNER.
MARTIN RIEBER.

References Cited in the file of this patent

UNITED STATES PATENTS

| Number | Name | Date |
|---|---|---|
| 2,376,027 | Bouchard | May 15, 1945 |
| 2,477,631 | Levy et al. | Aug. 2, 1949 |
| 2,481,240 | Rapson et al. | Sept. 6, 1949 |
| 2,482,891 | Aston | Sept. 27, 1949 |